United States Patent
Dziong et al.

(10) Patent No.: US 6,791,941 B1
(45) Date of Patent: *Sep. 14, 2004

(54) LEARNING-BASED ADMISSION CONTROL ADJUSTMENT IN DATA NETWORKS

(75) Inventors: Zbigniew Marek Dziong, Atlantic Highlands, NJ (US); Hongbin Ji, Robbinsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,733

(22) Filed: Sep. 28, 1999

(51) Int. Cl.⁷ .............................................. G01R 31/08
(52) U.S. Cl. ....................................... 370/229; 370/395
(58) Field of Search .................. 370/395.21, 229–235, 370/395.4, 395.41, 395.42–395.43

(56) References Cited

U.S. PATENT DOCUMENTS

| | | | |
|---|---|---|---|
| 5,315,586 A | | 5/1994 | Charvillat |
| 5,357,507 A | | 10/1994 | Hughes et al. |
| 5,463,620 A | * | 10/1995 | Sriram ........................ 370/60 |
| 5,570,360 A | * | 10/1996 | Klausmeier et al. .......... 370/60 |
| 5,583,857 A | * | 12/1996 | Soumiya et al. ............. 370/233 |
| 5,862,126 A | | 1/1999 | Shah et al. |
| 5,872,771 A | | 2/1999 | Park et al. |
| 5,878,029 A | | 3/1999 | Hasegawa et al. |
| 5,881,049 A | | 3/1999 | Beshai et al. |
| 5,917,804 A | * | 6/1999 | Shah et al. ................... 370/230 |
| 5,953,338 A | * | 9/1999 | Ma et al. ..................... 370/395 |
| 6,097,722 A | * | 8/2000 | Graham et al. .............. 370/394 |
| 6,324,166 B1 | * | 11/2001 | Yokoyama et al. .......... 370/234 |
| 6,459,681 B1 | * | 10/2002 | Oliva ........................... 370/232 |
| 6,490,249 B1 | * | 12/2002 | Aboul-Magd et al. ....... 370/232 |
| 6,625,155 B1 | * | 9/2003 | Dziong ...................... 370/395.2 |

* cited by examiner

Primary Examiner—Wellington Chin
Assistant Examiner—Brenda Pham (57) ABSTRACT

Tuning for connection admission control (CAC) algorithms in broadband ATM networks is accomplished using an overbooking technique based on aggregate effective bandwidth, AEBW, as an approximation to required bandwidth for given levels and classes of network traffic. An overbooking gain factor, $\alpha^r$ is developed—typically in a network operations system—based on long-term measurements supplied periodically by network switches. In operation, overbooking is introduced in small increments until a threshold (such as a cell loss threshold) is reached, at which point overbooking is reduced in a large step. A variety of network measurements can be used to apply the present invention to a range of traffic and service contexts.

20 Claims, 5 Drawing Sheets

AEBW: AGGREGATE EFFECTIVE BANDWIDTH

LEARNING-BASED ADMISSION CONTROL ADJUSTMENT IN DATA NETWORKS

RELATED APPLICATIONS

The present invention is related to the following concurrently filed applications: Model-Based Admission Control Adjustment in Data Networks, by Z. Dziong; Admission Control Adjustment in Data Networks Using Maximum Cell Count, by Z. Dziong and W. Lau. Each of these concurrently filed applications is assigned to the assignee of the present invention, and each is hereby incorporated by reference into the present application.

FIELD OF THE INVENTION

The present invention relates to high-speed data networks, such as Asynchronous Transfer Mode (ATM) networks. More particularly, the present invention relates to Admission Control for bandwidth management and congestion control in such networks. Still more particularly, the present invention relates to the use of Connection Admission Control (CAC) adjustments in ATM networks using network measurement data to further control and tune an analytical CAC system.

BACKGROUND OF THE INVENTION

In broadband integrated services networks, e.g., those using asynchronous transfer mode (ATM) systems and techniques, information is packetized in fixed length "cells" for statistical multiplexing with other traffic for transmission over high-bit-rate channels. Such networks are connection oriented, so a connection must be established before transmission begins. Moreover, these connections are usually subject to contracts between a network operator and users of the network. To ensure quality of service (QoS) consistent with these contracts, connection admission control (CAC) techniques are typically employed in management of such networks. Generally, CAC algorithms determine whether a new virtual channel connection should be admitted to the network based on network status—such as available resources, cell loss performance—and contract parameters (e.g., mean traffic rate and peak traffic rate). See generally, Dziong, Z., *ATM Network Resource Management*, McGraw-Hill, 1997.

Because of the complex variety of connection types and services, and consequent difficulty in ascertaining complete and current information regarding the actual state of ATM networks, and because of possible adverse consequences of failing to honor QoS guarantees in customer contracts, many network operators have chosen to use CAC algorithms that are quite conservative. Most CAC algorithms are designed for worst-case source behavior. Moreover, analytical models applied in these algorithms are also conservative—to account for the difficulty in achieving exact modeling of the connection aggregate process. Such conservative approaches in many cases tend to offset statistical multiplexing gains and other system efficiencies available in ATM networks.

Some have proposed using actual network measurements (such as traffic level and cell-loss characteristics in light of corresponding QoS constraints) to adjust CAC mechanisms in an attempt to more fully use network resources. See, for example, Bensaou, B.; Lam, S. T. C.; Chu, H. and Tsang, D. H. K., "Estimation of the Cell Loss Ratio in ATM Networks with a Fuzzy System and Application to Measurement-Based Call Admission Control," *IEEE/ACM Transactions on Networking*, VOL. 5, NO. 4 (August 1997), pp. 572–584; Gibbens, R. J., Kelly, F. P., and Key, P. B., "A decision-theoretic approach to call admission control in ATM networks," *IEEE Journal on Selected Areas in Communication*, 13(6):1101–1114 (1995); and Saito, H. "Dynamic call admission control in ATM networks, *IEEE Journal on selected Areas in Communication*, 9(7):982–989 (1991).

Thus far however, attempts to use network operating measurements have proven difficult in network administration, especially in respect of their incorporation in CAC processes. A particular difficulty arises in some prior art CAC processes in efficiently treating operations in networks exhibiting a wide variety of traffic types with a concomitant variety of QoS constraints. High bandwidth efficiencies through CAC tuning have not been readily available without high precision measurements.

SUMMARY OF THE INVENTION

The present invention overcomes limitations of prior art CAC algorithms and achieves a technical advance, as described in connection with illustrative embodiments presented below.

In accordance with one aspect of the present invention, the concept of aggregate effective bandwidth, AEBW, is used to provide a useful approximation to required bandwidth for given levels and classes of network traffic. AEBW is used in deriving an allowed level of overbooking—expressed in terms of overbooking gain, $\alpha^t$.

In accordance with another aspect of the present invention, a learning-based system and method for CAC model tuning is employed, typically in the context of a network operations system, to provide information to switches to control over-booking gain. This over-booking gain is derived from longer-term network behavior and is updated from time to time based on measurement values sent from individual switches to an operations system.

In operation, overbooking gain at individual switches is incremented in small steps to achieve higher link utilization, until a threshold level is reached reflecting an excess for a measured operating parameter—such as cell loss. When the threshold is reached, overbooking gain is decremented by a larger amount relative to the increments; and the incrementing-decrementing process is repeated. The size of the steps and timing of updates is typically based on longer-term statistics of network operations, and can be modulated by operator control.

BRIEF DESCRIPTION OF THE DRAWING

The above-summarized invention will be more fully understood upon a consideration of the following detailed description taken together with the attached drawing, wherein.

DETAILED DESCRIPTION

Figure 1:
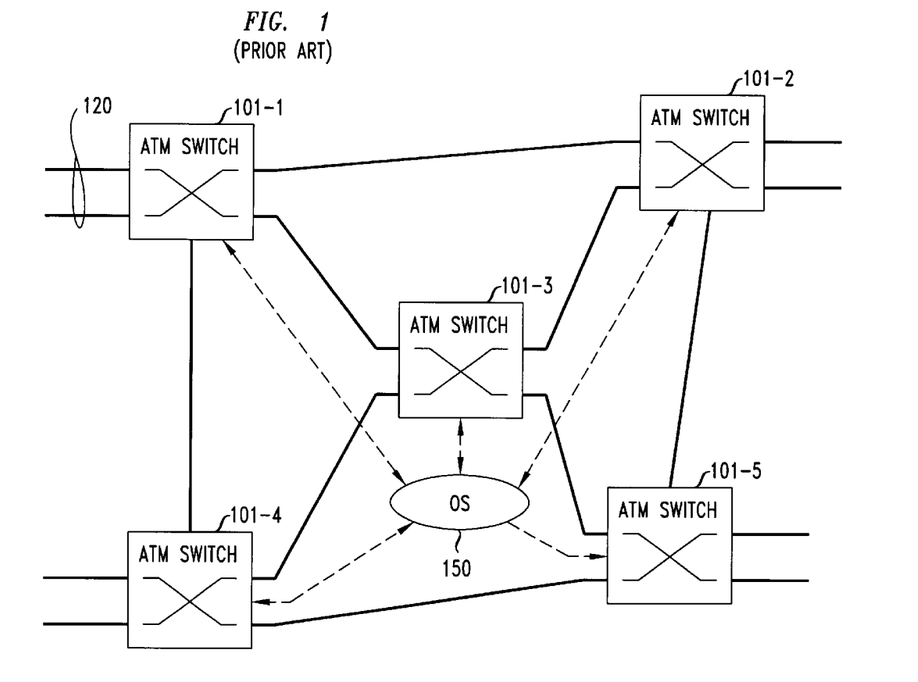
FIG. 1 shows a simplified representation of a network of interconnected switches communicating with an operations system. Such a network provides a context in which illustrative embodiments of the present invention find application.

FIG. 1 shows a simplified representation of a network of ATM switches interconnected by data links in which illustrative embodiments of the present invention will find application. Each of the ATM switches $101\text{-}i$, $i=1, 2, \ldots, N$ includes a plurality of input ports receiving input traffic streams from respective data sources, including output ports of other switches. Connections established through individual input ports generally reflect a variety of traffic forms, including permanent virtual connections (PVCs) or switched virtual connections (SVCs). Such input connections through input ports are represented collectively as 120 for illustrative switch 101-1. Though the number of switches, N, is shown as being equal to five for the illustrative network of FIG. 1, it will be understood that N may be any integer consistent with geographic and traffic requirements of a network. In general, each individual input stream will be subject to quality of service (QoS) constraints such as limits on cell loss, maximum cell delay and other such constraints known in the art.

Each ATM switch $101\text{-}i$ in FIG. 1 has a plurality of output ports, each connected over physical links to respective input ports of other ATM switches $101\text{-}i$, or to other networks or to multiplexers, terminals or other terminating devices or systems. Each of these output ports, in turn, will generally support a plurality of virtual connections that include links to the connected following switch. Additionally, of course, ATM switches $101\text{-}i$ shown in FIG. 1 typically comprise processor, buffering, switching fabric and other facilities normally found in ATM network switches.

Each ATM switch $101\text{-}i$ advantageously comprises facilities for monitoring switch and link activities and for controlling link operation under the direction of switch operating software executing on a processor at the switching node. Such software includes CAC control software for allowing or disallowing new or modified connections through the switch. Those skilled in the art will recognize that existing switch software is readily modified, based on present teachings, to achieve innovations and advantages of the present invention. In some cases a separate CAC tuning module at a switch directed to receiving tuning parameters and/or other control information from Operations System (OS) 150 and supplying data and control information to existing CAC algorithm software will prove preferable. In any event, functionality relating to CAC is advantageously adjusted or tuned at network switches in accordance with present inventive teachings, as described below.

As is well known, control of switch functionality in switches $101\text{-}i$ in FIG. 1 is advantageously grouped in so-called control and management planes in the switches. In accordance with common reference models for ATM network operations (such as CCITT Rec. I.321, 1991), communications protocols are referred to layers, including physical layer, ATM layer and ATM Adaptation Layer (AAL)—as well as higher layers. Each of these layers is then subject to management functions exercised by control and management planes, such controls typically include policing mechanisms for ensuring that cell streams conform to existing user contracts and scheduling algorithms for output ports. The control plane is typically used to signal between management objects at different physical locations, such as network nodes and user premises. See, for example, the above-cited Dziong book, especially pp. 5–9.

CAC algorithms usually decompose a connection admission problem into a number of link problems each dealing with traffic conditions and QoS parameters associated with links connecting an output port at one ATM switch to an input port at another ATM switch. Using well known monitoring, signaling and control functions of the aforementioned control and management planes, CAC algorithms at individual ATM switches control admission (or not) of newly presented connections (or connections seeking renegotiated service levels). As noted above, however, these CAC algorithms are often unduly conservative in their execution and therefore subject to operation at higher efficiencies when adjusted or tuned in accordance with the present inventive teachings.

Operations systems such as OS 150 shown in FIG. 1 are generally well known in the art. Such OSs perform many supervisory, billing and administrative functions in modern networks. In the context of FIG. 1 and the teachings of the present invention, OS 150 is arranged to receive traffic measurement and connection information from the several switches in the network and determine appropriate parameters for use at the switches in introducing controlled overbooking to achieve fuller use of the network facilities.

Figure 2:
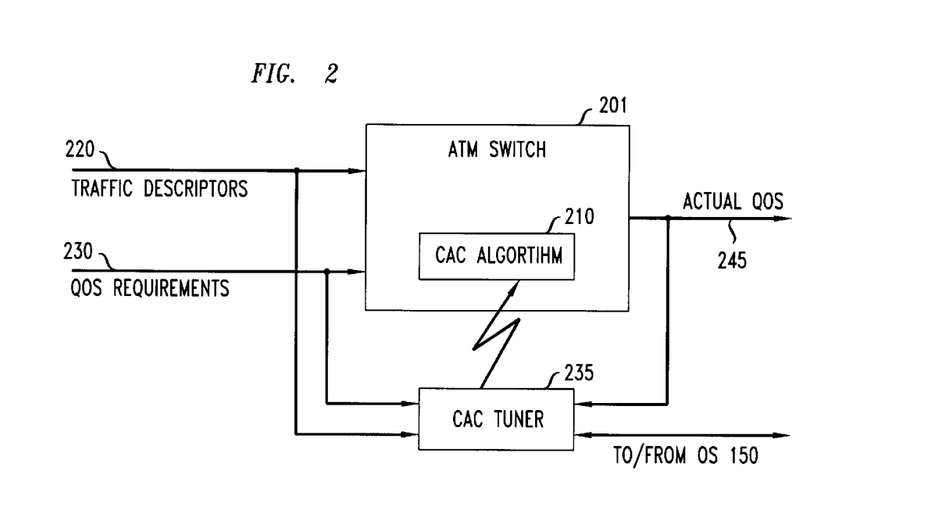
FIG. 2 shows a CAC tuner operating in conjunction with a switch-based CAC algorithm in accordance with one aspect of the present invention.

FIG. 2 shows an overall representation of an ATM switch 201 receiving traffic descriptors over input 220 and QoS requirements over input 230. This illustrative input information is used for, among other things, making CAC decisions using CAC algorithm 210. Some or all of the information appearing on inputs 220 and 230, as well as information relating to cell process performance at output ports, such as port 245 of switch 201, are also supplied to OS 150. CAC tuner 235, in accordance with an aspect of the present invention receives tuning parameters and/or other control information from OS 150 (based on longer-term network performance) regarding adjustments to be made to overbooking gain in administering the CAC processing at switch 201. The determination of this control information is performed at OS 150 and supplied to network switches. CAC tuner 235, in turn, receives this additional information and operates in accordance with a CAC tuner algorithm, which may assume any of a number of particular designs in achieving modifications to the operation of CAC algorithm 210. The manner in which such tuning or modification is performed in accordance with illustrative embodiments of the present invention will be described below.

A Definitional Framework for Viewing CAC Adjustments

Before proceeding with a detailed description of illustrative control algorithms, it proves convenient to define terms used in the following description, to more formally state the CAC adjustment problem and to describe certain preliminary aspects of embodiments of the present invention.

Figure 3A:
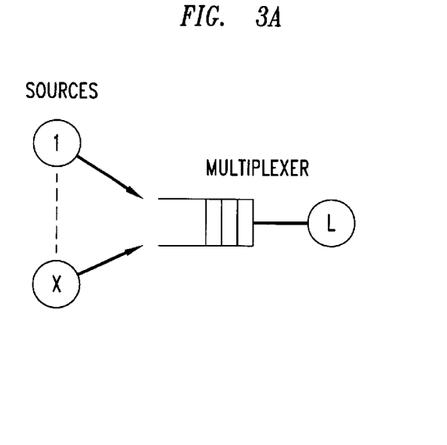
FIGS. 3A and 3B help illustrate the derivation of the concept of aggregate effective bandwidth, AEBW.
Figure 3B:
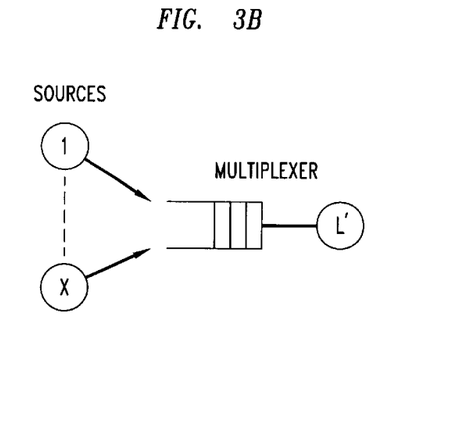

A first concept to be introduced is that of aggregate effective bandwidth, AEBW. For ease of presentation we consider first a one-priority case (a generalization to the multi-priority case will be given below). The definition is illustrated in FIGS. 3A and 3B. In FIG. 3A a plurality of connections are served in an ATM multiplexer characterized by link speed L. Under the assumption that the QoS constraints are not violated, we reduce the link speed to value L', as in FIG. 3B, at which speed the QoS constraints are tightly met. In other words, any further reduction of the link speed below L' would violate one or more of the QoS constraints. In the following we refer to L' as aggregate effective bandwidth, AEBW.

It also proves convenient to introduce the following notation for values associated with a particular switch output port for a particular state of connections:

$D^d$—nominal effective bandwidth allocated by CAC for priority j aggregate traffic based on source declared parameters (consistent with policing parameters—worst case);

$D^{ap}$—maximum actual effective bandwidth (based on exact model) required by priority j worst case aggregate traffic (consistent with policing parameters);

$D^a$—actual effective bandwidth required by aggregate traffic (smaller than $D^{ap}$ if sources' activity is intermittent and/or the declared parameters were "oversized");

$D^t=D^d/(\alpha^t+1)$—tuned effective bandwidth for aggregate traffic; ($\alpha^t$ is referred to as the over-booking gain);

$D^{ov}=D^{ap}-D^a$—bandwidth available for over-booking;

$E^{CAC}=D^d-D^{ap}$—CAC model error; (this is most likely positive);

$E^t=D^t-D^a$—tuned CAC error; (an objective is to keep this error small but positive).

Figure 4:
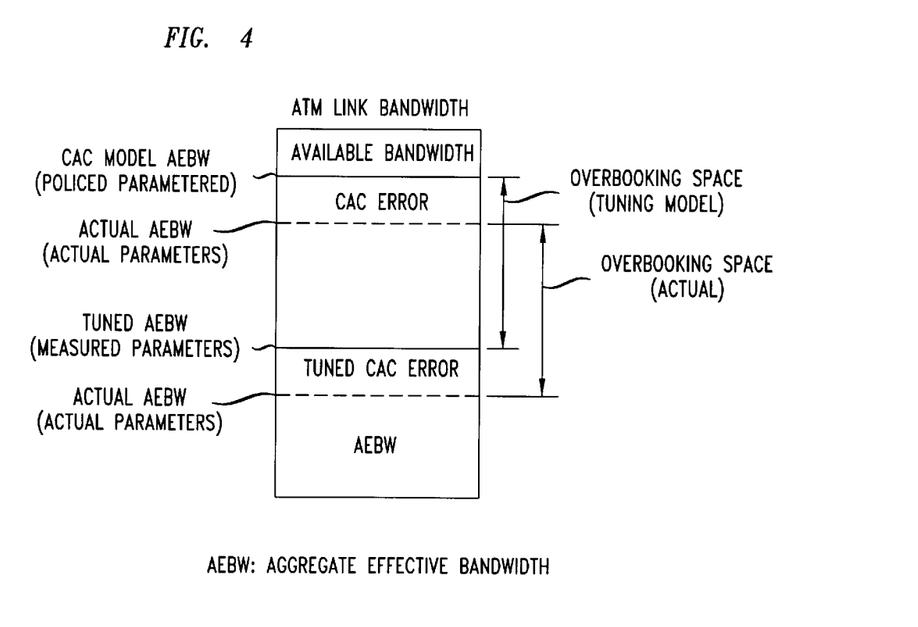
FIG. 4 shows available bandwidth in relation to total link bandwidth, AEBW and other bandwidth components.

The relation between these values is illustrated in FIG. 4 for a particular set of connections at a particular moment (assuming one priority class). Observe that the difference between the nominal effective bandwidth, $D^d$, and the actual bandwidth, $D^a$ is caused by two independent factors: CAC model error and source inactivity (especially PVCs which seek parameters based on peak activity periods, but which generally do not require these peak parameters at all times). For these reasons it is generally appropriate to consider the following objectives of CAC tuning:

OB1—reduce the CAC algorithm error

OB2—utilize the bandwidth available for over-booking (over-booking bandwidth);

OB3—reduce the CAC error and utilize the over-booking bandwidth

While the third objective is generally a preferred one, some solutions are limited to the second objective because of measurement or model limitations. Note that the first objective requires that all sources are using maximum bandwidth at the same time; this situation is not only unlikely but also difficult to identify.

CAC Algorithm Tuning Generally

With the foregoing motivation, analysis tools and preliminary approaches, it proves useful to divide CAC tuning approaches into two categories: direct and indirect. Indirect tuning is based on measurement of parameters that are not directly transferable into effective bandwidth, and are described, for example, in the incorporated patent application entitled Model-Based Admission Control Adjustment in Data Networks.

The embodiments of the present invention described by way of illustration below fall in the category of tuning algorithms based more directly on bandwidth. Before considering these illustrative embodiments, it proves useful to consider the problem more generally.

Relevant Time-Scales

One of the central time scales in illustrative embodiments of the invention is determined by the OS data collection cycle, which is advantageously fixed and is illustratively set to 15 minutes. This time scale selection can have significant consequences on the design and capabilities of CAC tuning algorithms operating in OS 150 and interacting with switches 101-$i$ in FIG. 1. This follows because in measurement-based CAC, most relevant time scales are defined in terms of the number of accepted connections and their holding times. For example, data of this latter variety can provide statistical information about the departure time for the next one or more calls, thus providing important information about the period for which a CAC decision has to provide for particular QoS constraints. For this reason, it may be important to distinguish between PVCs and SVCs in order to avoid the possibility that the nominal bandwidth of PVCs could exceed the link capacity during CAC tuning. In particular it means that, if such possibility exists, it may be required in some cases that bandwidth available for over-booking be used only by SVCs.

Another consequence of the illustrative 15-minute update period is that several connections can leave and arrive during such an interval. Thus, in general, any measured aggregate cell rate average cannot be related directly to a particular set of connections. The above constraints, combined with the reduction in effectiveness (resulting from over-booking) of the usual policing shield, favor non-real-time operation of CAC tuning performed in OS 150 in FIG. 1. Rather, such tuning is preferably based on a longer history of measured statistics.

"Busy Hour" Periods

Figure 5:
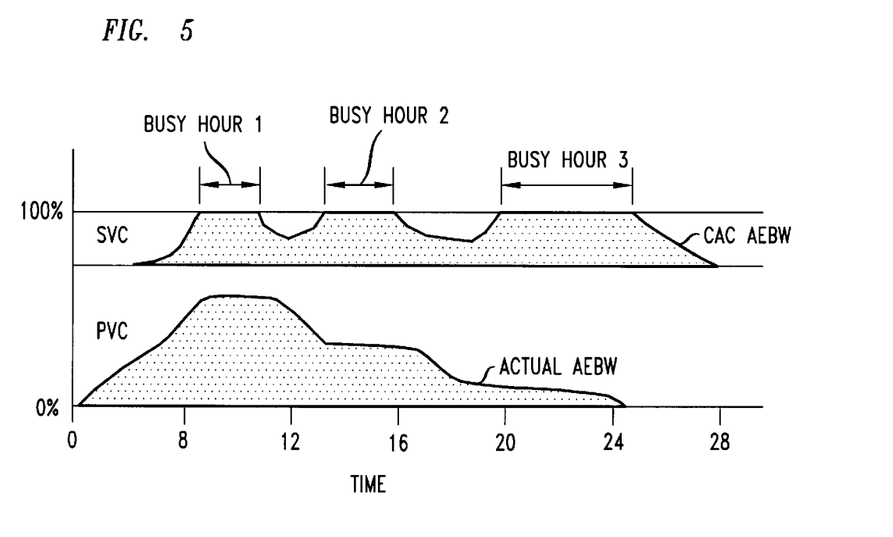
FIG. 5 illustrates the effect of "busy hour" traffic in networks such as that shown in FIG. 1.

In general, it is usually found that the most relevant measurements for CAC tuning are those made in the periods when all (or almost all) link bandwidth is allocated to connections by the normal CAC algorithm (represented by 210 in FIG. 2). We refer to such a state as a "busy period" (or "busy hour," though the duration need not be an hour). Note that busy periods can occur in different periods of the day, e.g., daytime or evening. This observation can be used to differentiate CAC tuning in different busy periods reflecting a different mix of connections and their parameters. In particular, it may occur that on average the permanent connections generated by business customers will be more prevalent during daytime, while evening hours will give rise to more switched connections originated by residential customers. This variation, illustrated in FIG. 5, may allow a higher degree of over-booking during evenings. Analogous differentiation will prove useful for different days of the week or, in some cases, seasons of the year. It is also important to identify trends—such as rapidly growing data traffic or frequent introduction of new services—and use discerned trends to modulate "overbooking" via CAC tuning.

Problem Formulation

Figure 6:
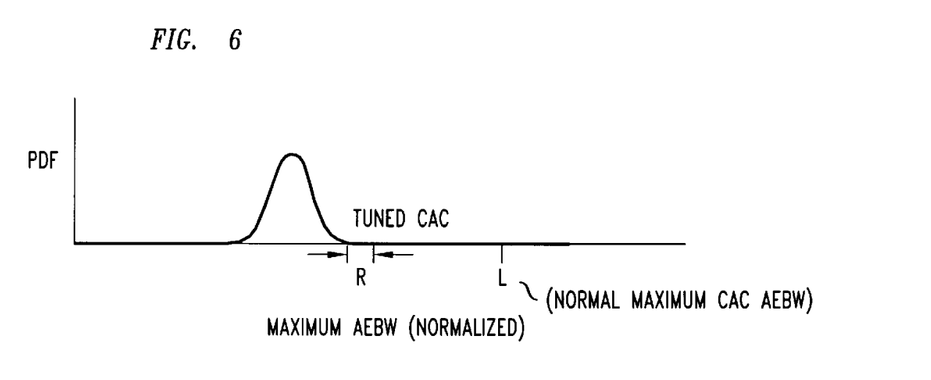
FIG. 6 shows a probability density function useful in understanding the use of embodiments of the present invention.

Here we formulate the problem in a generic way to create a framework for considering particular solutions. To simplify the initial presentation, we consider an ATM link with only one priority class. For the same reason we assume that in the worst case interval (to be described below) of the considered "busy hour" period the entire link bandwidth is allocated to the carried connections (for at least some time). Since our measurement cycle is illustratively taken as 15 minutes, the actual effective bandwidth can vary in this interval—due to changes in the set of connections and also due to changes in source behavior (non-stationarity, switching from active to inactive and vice versa). For this reason, we introduce the notion of maximum actual bandwidth in a 15 minute interval, $D_i^{ma}$, where i denotes the interval index. Now we consider the worst interval in a selected "busy hour" period, i.e., the 15-minute interval having the largest $D_i^{ma}$. For a given CAC algorithm, this bandwidth (henceforth refereed to as $D_{bh}^{ma}$) varies from one day to another due to randomness of source activities and connection mixtures. In accordance with one aspect of the present invention, it proves advantageous to estimate the probability density function (PDF) of this bandwidth from a histogram of its values over a period of days. An example of such a PDF is given in FIG. 6. Based on this PDF and required QoS constraints, the tuned effective bandwidth can be evaluated from $$P\{D_{bh}^{ma} > D^t\} > \epsilon, \quad (1)$$

where $\epsilon$ is determined by QoS requirements. Then, the final over-booking gain is given by $$\alpha^t = [L/(D^t + R)] - 1, \quad (2)$$

where the bandwidth R is added for protection against the PDF estimation error and L is the link capacity.

A Learning Approach to CAC Tuning

Figure 7:
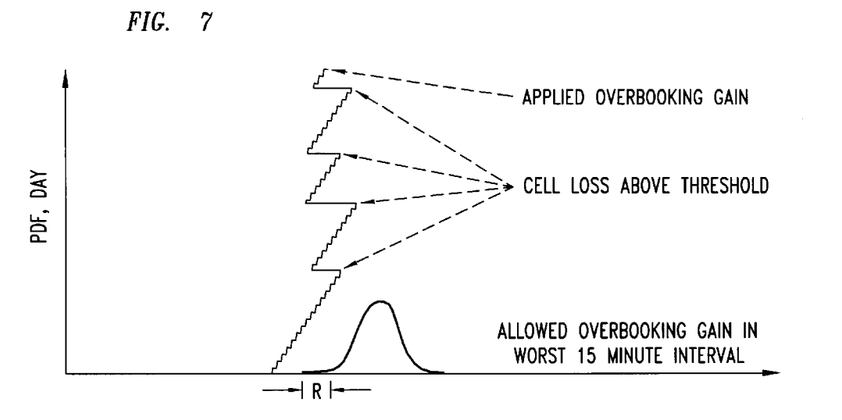
FIG. 7 shows typical "staircase" overbooking gain adjustments in accordance with an illustrative embodiment of the present invention.

In the following approach to CAC tuning, we assume that only QoS measurements over the 15 minutes intervals are available from network switches. At the beginning of instances of a given "busy hour" period the over-booking gain is increased in CAC tuner 235 as it is applied to the main CAC algorithm 210 in switch 201 in FIG. 2. This increase in overbooking gain is asserted in small steps, until the QoS requirements are met or violated. If the QoS requirements are violated the over-booking gain is immediately decreased in a large step, $\delta_{dn}(\overline{V_{QoS}})$, whose size is a function of the measured QoS violation degree, $\overline{V_{QoS}}$. This procedure is illustrated in FIG. 7. The effectiveness of this approach is a function of the size of the steps, $\delta_{up}$ and $\delta_{dn}(\overline{V_{QoS}})$. In particular, by reducing $\delta_{up}$ and increasing $\delta_{dn}(\overline{V_{QoS}})$ one can reduce the level and frequency of losses. Acting in the opposite direction increases bandwidth utilization. The optimal values of $\delta_{up}$ and $\delta_{dn}(\overline{V_{QoS}})$ are advantageously estimated from long term statistics of the system performance. This optimization is conveniently performed in an on-going manner to adapt to changing environments.

It also proves advantageous in many cases to analyze samples from different ports and switches to extract features which are independent of a traffic process at a particular port. In particular, it proves useful to determine what value of overbooking gain parameter is safe under all circumstances. Another useful analysis finds features of PDFs for particular links that are a function of the link speeds. Such an analysis of data aggregated over the ports and switches provides guidance in the selection of particular overbooking strategies.

Figure 8:
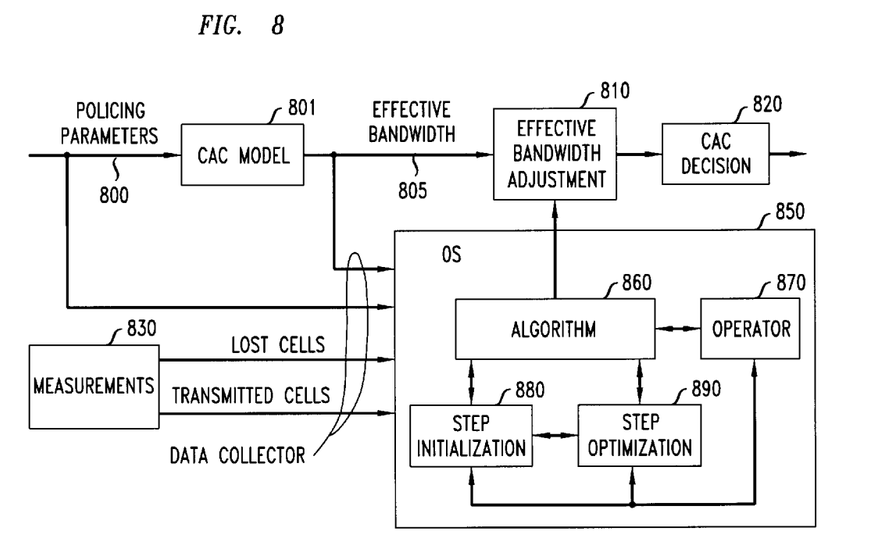
FIG. 8 illustrates in greater detail an illustrative CAC adjustment arrangement of the type shown generally in FIG. 2 and embodying principles of the present invention.

FIG. 8 shows a block diagram of an illustrative structure for performing CAC tuning in accordance with the above-described learning techniques. There, a CAC model 801 operating at a switch is seen receiving connection parameters (policing parameters) on input 800 from a data source. In basic operation, CAC model 801 determines effective bandwidth based on the requested bandwidth and bandwidth already allocated to existing connections. This result would be forwarded to CAC decision block 820 for allowing or refusing the newly presented (or renogtiated) connection. In the illustrative tuned CAC system of FIG. 8, however, additional inputs from OS 850 are also presented to the CAC decision through effective bandwidth adjustment block 810. So, based on inputs from OS 850, the effective bandwidth is modified, thereby potentially altering the CAC decision at 820.

OS 850, in turn, receives measurement inputs from individual switches. Illustratively, the system of FIG. 8 shows a switch-based measurement unit 830 sending the number of cells transmitted in a measurment interval at the measurement point, and the number of lost cells. These measurements and, in some cases, the input policing parameters, are used at OS 850 for processing by the tuning algorithm 860 to derive step initialization and step optimization, as reflected by blocks 880 and 890, respectively, in FIG. 8. Also shown at OS 850 in FIG. 8 is the operator block 870 reflecting the opportunity for a human operator (or other monitor) to provide inputs to the tuning algorithm 860, step initialization 880 and step optimization 890. These processes operating in OS 850 are thus subject to modification or override by the human or other operator. In particular cases, the operator function may be effected by directory services or other policy delivery mechanism to reflect a local, regional or overall network condition.

Generalization to Multi-Priority Systems

Thus far, it has been assumed that an ATM switch output port has one priority queue and that at least one 15-minute interval during the "busy hour" period the full bandwidth capacity is used. In learning-based solutions based on principles of the present invention, QoS violations will generally appear first for low priority services, even though a violation may be caused by a too-large overbooking of high priority services.

In considering how overbooking gain should be distributed between or among connections for different priorities/services, a plurality of particular approaches may be adopted. In accordance with one technique, a simplified analytical model fed by measured basic parameters of traffic having respective priorities. Average rate per service is one such example.

An alternative approach to distributing overbooking gain employs prior experience with services and related cell traffic. Analyses of data relating to such prior behavior indicate such factors as failure to fully use provisioned bandwidth. It will be recognized, however, that very accurate apportionment of overbooking is not generally required because QoS is still under the control of the tuning process.

Other particular overbooking gain distributions will occur to those skilled in the art in light of particular requirements or operating conditions. In some cases, e.g., it proves advantageous to group services and apply a given apportionment of overbooking gain to each of a plurality of such groups. Similarly, it will prove convenient to further apportion a group apportionment of overbooking gain between particular categories of services or between individual services in the respective groups. Further hierarchical apportionments may prove useful in particular cases.

Typical Measurements

A variety of measurement information will prove useful in implementing particular tuning algorithms to meet particular needs. In this section we list a number of generally useful measurements useful in augmenting or replacing systems of the type shown in FIG. 8, where only transmitted cells and lost cells are employed (in addition to connection information reflected in policing parameters). Thus, in particular cases, those skilled in the art seeking to apply the present inventive teachings will employ measurements selected from a group of measurements and controls (using industry-standard acronyms) comprising (but not limited to):

Cell Loss ratio per service (e.g., CBR, rt-VBR, nrt-VBR, ABR) per port;

CDV per service (CBR, rt-VBR) per port;

Average cell rate per service per port.

Declared average rate per service per port;

Aggregate bandwidth allocated per service per port—on demand;

Control of overbooking factors per service per port—on demand;

Aggregate bandwidth allocated to PVCs and SPVCs per service per port—on demand;

Average holding time for SVCs—on demand;

Number of SVCs—on demand; and

Maximum aggregate effective bandwidth allowed for PVCs per service per port.

In addition, it will prove useful in some cases to employ additional measurements at the same periodic (e.g., 15-minute) intervals:

Counts per selected VP/VC:

successfully passed cells with CLP=0+1;

successfully passed cells with CLP=0.

In addition to the foregoing, useful information obtained from the PNNI advertisement will include, in appropriate cases:

available effective bandwidth (per service per port);

CDV for CBR, $VBR_{rt}$, $VBR_{nrt}$.

While many of these measurements may be available in particular switches, some switches may provide only approximations for these measured quantities. For example, CDV values may be provided only in approximate form.

Further, though many of the above measurements will prove useful in varying contexts, a useful minimal set of measurements and controls to perform the learning-based techniques described above may include only:

Approximate cell loss ratio per service (and aggregate) per port in 15-minute intervals; and Bandwidth available for new connections per port—on demand.

To perform optimizations in respect of the tuning algorithm it proves useful to also include: the ratio of measured mean rate to declared mean rate (SCR, PCR) for aggregate traffic per service per port in the illustrative 15-minute measurement intervals. If only overbooking by SVCs is to be treated, it will prove useful to include: bandwidth allocated to aggregate of PVCs (based on decalartions) per port.

An Illustrative OS-Based CAC Tuning Process

Figure 9:
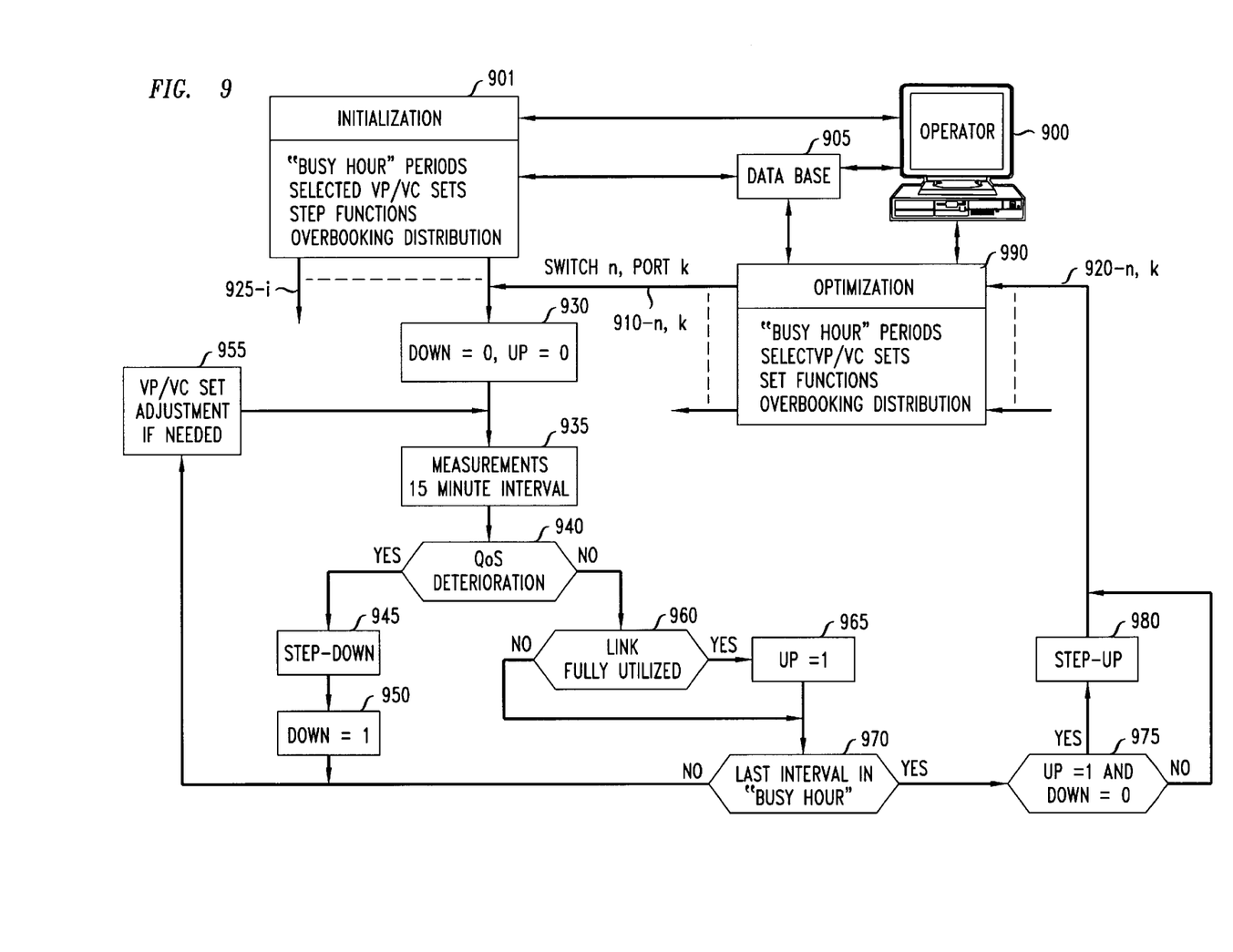
FIG. 9 is a flowchart showing operations in an illustrative OS-based CAC tuning process for receiving periodic information and supplying control information to network switches.

FIG. 9 is a flowchart illustrating typical processing for an OS-based tuning algorithm used in an illustrative network of switches in accordance with another aspect of the present invention. While much of typical processing in accordance with a method such as that illustrated in FIG. 9 is switch independent, provision can readily be made for structure or functions of particular switches. Such adaptations to particular switches will occur, for example, if particular switches do not supply measurements of one kind or another.

Shown in FIG. 9 is an initialization block 901 illustratively dealing with four main functions: determination of "busy-hour" periods, selection of virtual path/virtual connection (VP/VC) sets, evaluation of an initial distribution for the overbooking gain, and evaluation of initial values for the adjustment steps. Additionally, evaluation of connection departure rates may be employed—thus influencing overbooking aggressiveness. Unless a history already exists for particular contexts, measurements extending over a period of time (e.g., one month) will generally be required to acquire the necessary information for initialization.

Busy hour periods are determined based on measurements for respective network links without the use of CAC tuning. Such periodic (e.g. 5-minute periods) measurements will typically be for available bandwidth per service per port. When derived over the requisite time frame, it proves convenient to represent the busy-hour periods in terms of start and end times.

VP/VC selection typically relates to estimates of cell loss per service per port and average cell rate as an estimate of a possible overbooking range. Initialization for step functions relates to experience-based step size for use in the manner of FIG. 7. Initial settings for overbooking distribution are dependent upon particular services at particular ports, as noted above. The historic data upon which initial and updated values for algorithm parameters are based are conveniently stored in a database shown as 905 in FIG. 9. Operator intervention and supervision is provided by operator console 900 in FIG. 9. The output from the initialization phase of the process of FIG. 9 is provided for each port (k) for each switch (n) and comprises initial settings for adjustments at the respective switches. Block 930 provides initialization for the process parameters "down" and "up."

In operation in a typical busy-hour period, the process of FIG. 9 may be divided into two parts: the actual CAC adjustment information provided to switches in the network, and optimization of the algorithmic process by adjusting its parameters based on historic information. Thus, in the CAC adjustment aspects measurements are received at the OS, typically every 15 minutes. The particular measurements will vary with context, but typical values monitored are given above. This step is reflected in FIG. 9 by block 935.

A test is made at decision block 940 regarding the status of QoS for the particular port or port/service, or the like subject to overbooking adjustment. If a deterioration has been detected, the step down operation is effected and down is set to 1. Adjustment of the VP/VC selection is desirably accomplished by substituting VP/VC having low transmitted to declared ratios.

If no QoS deterioration was detected at decision block 940, (down remains set at 0) then a test is made at block 960 as to whether a particular link is fully utilized. If the link is found to not be fully utilized and, if the current interval is not the last in a busy hour (test 970), then the loop back through block 935 is repeated. If the link utilization test at block 960 finds that the link is fully utilized, then up is not set to 1, but the test at 970 is performed.

If the test at 970 yields a yes result, then the "step up" sub-process is performed. Thus, if the test at 975 shows that up=1 and down=0, then the step-up function is executed, thereby to cause the overbooking factor for the particular port to be increased by $\delta_k^{up}$ for the next busy-hour period. If the values for up and down are other than 1 and 0, respectively, then the current level of overbooking is maintained.

Optimization block 990 receives inputs on inputs 920-i for respective ports on respective switches and performs optimization of the indicated illustrative functions and supplies updated values on outputs 910-i for processing in future measurement cycles. Thus, the illustrative tuning algorithm of FIG. 9 is continually being updated, and the corresponding switch/port data provided to the network switches is likewise kept current.

Complementary Features of Various Algorithms

As will be appreciated by those skilled in the art, the CAC tuning systems and methods described in the present application, and those described in the incorporated patent applications, are complementary in many ways and can be used cooperatively to improve the overall tuning result. For example the model-based techniques described in the incorporated application entitled Model-Based Admission Control Adjustment in Data Networks can be used in combination with teachings of the present learning-based approach.

Numerous and varied other methods and systems for tuning CAC performance in ATM networks within the scope and spirit of the present invention will occur to those skilled in the art in light of the present teachings.

While the term Connection Admission Control has been associated with the acronym CAC, this acronym is also used with the term Call Admission Control; such different usage connotes no difference of meaning in application of the present invention—the two terms may be used interchangeably. In each case the reference is to the admission, or not, of new (or renegotiated) virtual connections.

While ATM systems have been used to illustrate the principles of the present invention, those skilled in the art will find application of these teachings in other particular admission control contexts.

What is claimed is:

1. In a packet communications system, a method for adjusting a connection admission control (CAC) process for a port at a switch, the method comprising for each of a plurality of successive time intervals,
   collecting measurements of at least one traffic parameter for existing connections at said port,
   determining an overbooking gain based on past behavior of connections at said port, and
   adjusting said CAC process at said port for the next of said time intervals based on said overbooking gain.

2. The method of claim 1 wherein said packet communications switch is a cell communications switch operating in accordance with one or more ATM protocols.

3. The method of claim 1 wherein said adjusting comprises increasing bandwidth available for allocation to connections at said port in increments for each successive period while a quality of service (QoS) requirement is not violated at said port.

4. The method of claim 1 wherein said adjusting comprises decrementing bandwidth available for allocation to connections at said switch when a quality of service (QoS) requirement is violated at said port.

5. The method of claim 3 wherein said adjusting further comprises decrementing bandwidth available for allocation to connections at said port when a quality of service (QoS) requirement is violated at said port.

6. The method of claim 5 wherein the amount of bandwidth subject to decrementing during any time interval is large relative to the amount of bandwidth subject to incrementing during any time interval.

7. The method of claim 1 wherein said at least one traffic parameter is selected from a group of traffic parameters comprising a QoS parameter.

8. The method of claim 7 wherein said collecting is performed in an operations system (OS) serving a plurality of switches.

9. The method of claim 1 wherein said time intervals are each of duration sufficient to permit the exit and entry of a plurality of connections through said port.

10. The method of claim 1 wherein said time intervals are each of duration substantially equal to 15 minutes.

11. The method of claim 1 wherein said adjustments are made only during busy intervals for said port.

12. The method of claim 6 wherein the size of said increments and decrements is based on a probability distribution determined from past behavior of traffic at said port.

13. The method of claim 8 wherein said determining is performed in an operations system (OS) serving a plurality of switches.

14. The method of claim 13 wherein said determining comprises
   initializing values for said incrementing and decrementing,
   decrementing said overbooking gain if said QoS parameter indicates a deterioration of quality of service at said port,
   when said QoS parameter does not indicate a deterioration of quality of service at said port and said port is using all bandwidth available, maintain current the current value for said overbooking gain, and
   when said QoS parameter does not indicate a deterioration of quality of service at said port and said port is not using all bandwidth available, increment said overbooking gain.

15. The method of claim 5 wherein said determining further comprises optimizing said increments and decrements based on history of performance of traffic at said port.

16. The method of claim 5 wherein said determining further comprises adjusting said increments and decrements based on operator input.

17. An operations system (OS) for adjusting a connection admission control (CAC) process for at least one port at a switch in use in a packet communications system comprising
   means for collecting measurements of at least one traffic parameter for existing connections at said port for each of a plurality of successive time intervals,
   means for determining an overbooking gain based on past behavior of connections at said port, and
   means for adjusting said CAC process at said port for the next of said time intervals based on said overbooking gain.

18. The system of claim 17 wherein said switch comprises a plurality of ports and said OS is performed for each of said ports.

19. The system of claim 18 wherein said switch comprises a plurality of output ports, said switch providing multiple-priority traffic on at least one of said output ports, and said adjusting said CAC process is performed separately for traffic of each priority for said at least one of said output ports provided with multiple-priority traffic.

20. A connection-based packet communications system comprising
   a plurality of switches, each switch comprising
      a plurality of input ports and a plurality of output ports,
      a connection admission control (CAC) system for controlling the admission of connections through said switch,
   means for measuring at least one traffic parameter at each port of said switch,
   an operations system (OS) comprising
      means for determining an overbooking gain for each port of each of said switches, said determining based on past performance of traffic at respective ones of said ports in respective ones of said switches, said determining further based on said at least one traffic parameter for said respective ones of said ports in respective ones of said switches,
      means for adjusting said CAC system for each of said ports in each of said switches in accordance with said overbooking gain.

* * * * *